Jan. 22, 1963
D. S. LANG
3,074,379
INSECTICIDE APPLICATOR
Filed July 31, 1961
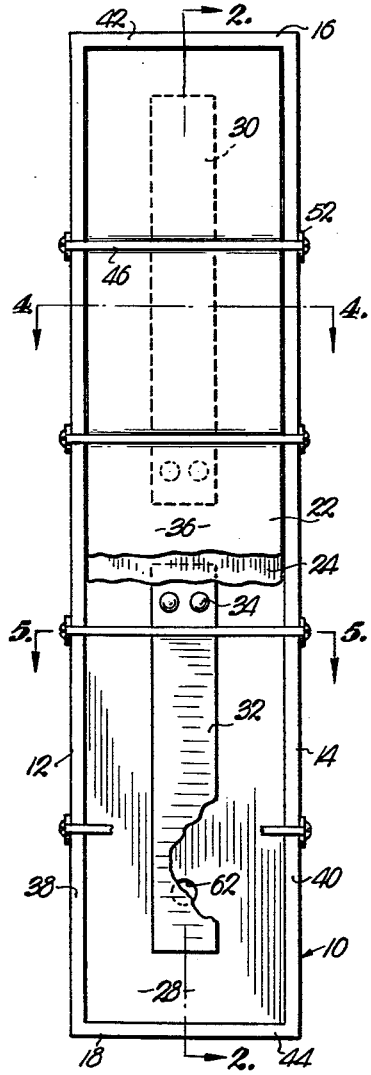
Fig. 1.
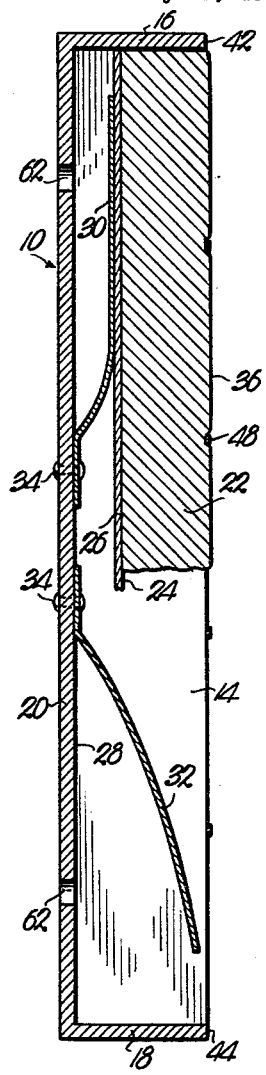
Fig. 2.
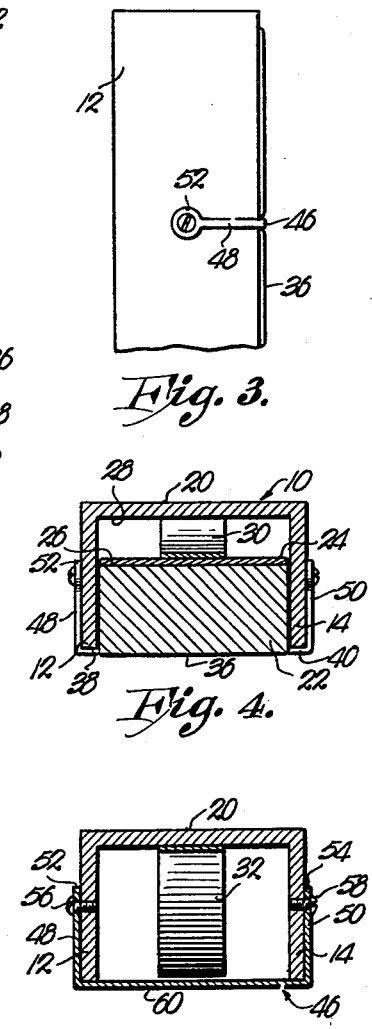
Fig. 3.
Fig. 4.
Fig. 5.
INVENTOR.
Dickson S. Lang
BY
Hovey, Schmidt, Johnson & Hovey
ATTORNEYS.

United States Patent Office 3,074,379
Patented Jan. 22, 1963

3,074,379
INSECTICIDE APPLICATOR
Dickson S. Lang, Kansas City, Mo., assignor to Consumers Cooperative Association, Kansas City, Mo., a corporation of Kansas
Filed July 31, 1961, Ser. No. 127,968
4 Claims. (Cl. 119—157)

This invention relates to applicators for insecticides or the like, and more particularly, to a unit for use in the controlled application of insecticides, repellents, medicaments or the like to cattle or other animals.

It is the most important object of this invention to provide an applicator which has a box-like frame capable of carrying an impregnated material in such a manner that the material is retained in a position whereby the animal, by rubbing against the applicator, may apply appropriate quantities of the material to its pelt.

A yet further object of this invention is to provide a bar of wax-like material, which material may be impregnated with an insecticide, repellent, medicament or the like, the bar being retained within a frame and there being resilient means associated with the frame and bearing against one surface of the bar, whereby the bar is urged outwardly with respect to the frame to dispose the opposite surface of the bar in a position easily accessible to an animal, allowing the animal to rub against the impregnated bar and thus transfer to its pelt a quantity of the material with which the bar is impregnated.

Another aim of this invention is to provide an insecticide applicator having a frame, the frame receiving a bar of impregnated material which is normally urged outwardly with respect to the frame by leaf springs secured to the frame, the extent of outward movement of the bar being limited by retaining clips which are also carried by the frame.

Another object of this invention is to provide an applicator which is capable of disposing an insecticide carrying material in a position allowing animals to rub against the material and transfer the same to their pelts, but which also has means for limiting the amount of such material that is applied during a single movement of an animal against the applicator.

Other objects of the invention include details of construction which will become apparent from the following specification and accompanying drawing, wherein:

FIGURE 1 is a plan view of the insecticide applicator, parts being broken away to reveal details of construction;
FIG. 2 is a sectional view taken on line 2—2 of FIG. 1;
FIG. 3 is a fragmentary view of one side member of the applicator;
FIG. 4 is a sectional view taken on line 4—4 of FIG. 1; and
FIG. 5 is a sectional view taken on line 5—5 of FIG. 1.

The insecticide applicator forming the basis of this invention comprises a substantially box-like, polygonal frame broadly designated by the numeral 10, which frame has a pair of side members 12 and 14 disposed in parallel relationship, end walls 16 and 18 disposed in opposed, parallel relationship, and a bottom 20.

Frame 10 is rigid in construction and may, if desired, be formed from a length of channel iron having the ends thereof closed as by walls 16 and 18, whereby to attain the open top, box-like construction clearly illustrated in FIGS. 1 and 2.

Frame 10 receives, within the confines thereof and between side members 12 and 14 and end walls 16 and 18 respectively, a bar of wax-like material 22, which bar is impregnated with the desired material such as an insecticide, repellent or medicament to be applied to animals in the manner which will be hereinafter described. Bar 22 has a plate 24 in the nature of a backing piece overlying one surface 26 of the bar 22, said surface 26 being proximal to inner face 28 of bottom 20.

Bottom 20 has secured to face 28 thereof, a pair of elongated leaf springs 30 and 32 of the configuration best illustrated in FIGS. 1 and 2, the adjacent ends of springs 30 and 32 each being fastened to bottom 20 by means of rivets such as 34. The opposite, unsecured ends of leaf springs 30 and 32 extend toward end walls 16 and 18 respectively, and are free whereby to bear against plate 24. It will be seen that the result of the cooperative action of leaf springs 30 and 32 is to urge bar 22 outwardly with respect to frame 10, whereby to dispose the surface 36 thereof opposite to surface 26 in a plane spaced outwardly from the plane of the free edges 38 and 40 of side members 12 and 14 and 42 and 44 of end walls 16 and 18 respectively, thus placing surface 36 in a position whereby an animal may rub thereagainst and, by such rubbing, transfer to its pelt a certain amount of the material of bar 22. Thus, the action of leaf springs 30 and 32 is to urge bar 22 outwardly with respect to frame 10 and to thereby constantly present a functional or rubbing surface 36 of the bar 22 in a position accessible to an animal who rubs against the applicator.

To limit the outward movement of bar 22 with respect to frame 10, a plurality of retainer clips 46 are carried by frame 10, such clips 46 having the configuration shown in FIG. 5, whereby to present a pair of opposed leg portions 48 and 50 which engage the opposed side members 12 and 14 respectively in the manner best illustrated in FIG. 5. Leg portions 48 and 50 of each clip 46, have an eye 52 and 54 respectively, formed in the free end thereof, each of said eyes overlying a hole tapped in the corresponding side member, whereby screws, such as 56 and 58, may be inserted through eyes 52 and 54 to fixedly secure clips 46 to frame 10.

Retainer clips 46 also have, as an integral part thereof, a central portion 60 which overlies the functional or rubbing surface 36 of bar 22. Clips 46 are spaced substantially equidistantly along frame 10 and serve to limit the outward movement of bar 22 to a distance which may be predetermined by the length of leg portions 48 and 50 of clips 46, thus allowing springs 30 and 32 to urge bar 22 outwardly only the distance necessary for a sufficient application of the material to an animal who rubs against the applicator one time. It will, of course, be appreciated that springs 30 and 32 constantly urge bar 22 outwardly, even as the same may diminish in size during use thereof and that, by repeated rubbings against surface 36, an animal may apply to itself varying quantities of the material from which the bar 22 is composed.

The applicator forming the base of this invention may be used in many different manners, but normally, the same would be disposed in a vertical position by insertion of fastening means through openings 62 and bottom 20, and at a height convenient to the animal who it is desired to have rub thereagainst. When so disposed, the major portion of bar 22 is retained within the confines of frame 10 and yet the functional surface 36 thereof is constantly disposed in a position readily accessible to the animal.

While only one insecticide applicator has been illustrated in the drawing, it will be appreciated that a plurality of such units may be utilized and positioned in an appropriate manner, whereby an animal may simultaneously rub various portions of its body against the outer rubbing surfaces 36 of a number of bars such as 22.

Having thus described the invention, what is claimed as new and desired to be secured by Letters Patent is:
1. An insecticidal applicator comprising:
a frame provided with a bottom, and a pair of side members and a pair of end walls having margins defining an open outlet;

a bar of wax-like insecticide carrying material positioned in said frame between said side members and said end walls in overlying relationship to said bottom and provided with a relatively flat outer surface and an opposed inner surface facing the bottom;

resilient means interposed between the bottom of said frame and said inner surface of the bar for biasing the bar in a direction away from said bottom through the open outlet of the frame; and a plurality of spaced, elongated, independent, relatively narrow clips carried by the frame and extending across said open outlet in dispositions and of lengths to engage said outer surface of the bar and retain the latter in said frame, each of the clips being at least partially embedded in said outer surface of the bar to an extent providing substantially full rubbing access to said outer surface of the bar.

2. An insecticidal applicator as set forth in claim 1 wherein each of the clips spans the distance between opposed outer margins of the side members, all of the clips being in substantially parallel relationship with the portions thereof extending across said open outlet being in generally coplanar relationship to said margins of the side members and said end walls of the frame.

3. An insecticidal applicator as set forth in claim 1 wherein each of said clips is of generally U-shaped configuration and provided with a central portion overlying the bar and at least partially embedded in said outer surface thereof, and spaced, parallel leg portions extending laterally from opposite extremities of said central portion, said leg portions overlying and being removably secured to corresponding outer faces of said side members of the frame.

4. An insecticidal applicator as set forth in claim 3 wherein each of said leg portions of the clips is provided with an eye segment thereon positioned to lie in flat engagement with said outer face of a corresponding side member, there being screw retainer means passing through each of the eye segments and removably threaded into a respective side member.

References Cited in the file of this patent

UNITED STATES PATENTS

| | | |
|---|---|---|
| 1,625,677 | Palm et al. | Apr. 19, 1927 |
| 1,837,571 | Morris | Dec. 22, 1931 |
| 1,878,399 | Hope | Sept. 20, 1932 |